United States Patent

Jennings et al.

[11] Patent Number: 5,914,673
[45] Date of Patent: Jun. 22, 1999

[54] SYSTEM FOR UTILITY METER COMMUNICATIONS USING A SINGLE RF FREQUENCY

[75] Inventors: Patrick Leonard Jennings, Duluth; Ruben Emilio Salazar Cardozo, Norcross, both of Ga.

[73] Assignee: Schlumberger, Norcross, Ga.

[21] Appl. No.: 08/643,191

[22] Filed: May 6, 1996

Related U.S. Application Data

[63] Continuation-in-part of application No. 08/611,694, Mar. 6, 1996.

[51] Int. Cl.[6] .............................. G08C 15/06; G08C 19/20
[52] U.S. Cl. ................................ 340/870.03; 340/870.02; 340/870.11; 340/825.52; 455/422
[58] Field of Search .................................... 455/422, 421, 455/446, 449; 340/870.02, 870.03, 870.07, 870.11, 870.13, 870.3, 825.52, 825.07

[56] References Cited

U.S. PATENT DOCUMENTS

| | | |
|---|---|---|
| 4,466,001 | 8/1984 | Moore et al. ...................... 340/825.52 |
| 5,150,114 | 9/1992 | Johansson ........................... 340/870.03 |
| 5,553,094 | 9/1996 | Johnson et al. ..................... 340/870.06 |

*Primary Examiner*—Michael Horabik
*Assistant Examiner*—Timothy Edwards, Jr.
*Attorney, Agent, or Firm*—Leonard Pojunas

[57] ABSTRACT

The system provides a way to use a single RF channel in a cellular, RF meter reading system. In order to avoid adjacent cell concentrator interference while reducing the overall time required to perform repetitive tasks such as meter reading and performing load survey reads, the system has each of the concentrators send out a general command to all of the meter interface units ("MIUs") in its cell, and the MIUs then each send back their data in turn. In order to accomplish that result, the MIUs in each cell are preprogrammed to transmit a preset time period (different for each MIU in a particular cell) following receipt of the general command requesting data.

The AMR reporting sequence in each cell is assigned based upon the physical distance of an MIU which is being assigned an AMR reporting sequence number from the MIU which had been assigned the prior AMR reporting sequence number.

9 Claims, 10 Drawing Sheets

FIG. 3

| Single frequency, Single cell, AMR and Load Survey | Value | Units |
|---|---|---|
| 1-Month | 30 | days/month |
| 2-Meters per territory (all Class 2) | 2,000,000 | units/territory |
| 3'-Time for each one-way communication exchange | 0.405 | seconds/comm |
| 3"-Reading rate | 2.469 | reads/second |
| 4-Success rate | 90% | percent |
| 5- Net reading rate | 2.222 | reads/second |
| 6-Month | 2,592,000 | seconds/month |
| 7-Net readings/month @ 90% reliability | 5,760,000 | readings/month |
| 8-Readings available for load survey | 3,760,000 | readings |
| 9-Possible Readings/meter/month at 15 min for load survey | 2,880 | readings/month/meter |
| 10-Meter-months in load survey | 1,306 | meter-months |
| 11'-Total time spent in AMR (secs.) | 900,000 | seconds |
| 11"-Total time spent in AMR (hrs.) | 250 | hours |
| 12-Percentage of time allocated for AMR (per month) | 34.7% | percent |
| 21-Average number of meters/concentrator | 6,000 | units |
| 22-Average number of concentrators | 333.3 | units |
| 23-Average number of readings/concentrator | 6,666.7 | units |
| 23-Time per month per concentrator to read meters (secs.) | 2,700 | seconds |
| 23'-Time per month per concentrator to read meters (hrs.) | 0.75 | hours |
| Total percentage of time used for AMR (per month) | 34.7% | percent |

FIG. 6

| Single frequency, Multicell, one-way and two-way AMR | Value | Units |
|---|---|---|
| 1-Month | 30 | days |
| 2-Meters per cell (or MIUs per concentrator) | 6,000 | units/cell |
| 2'-Percentage of Class 2 MIUs | 100% | percent |
| 2"-Total number of Class 2 meters per cell | 6,000 | units |
| 3'-Time for each one-way communication MIU-CIU | 0.210 | seconds/comm |
| 3"-Reading rate | 4.762 | reads/second |
| 4-Allow slots for ODR, TDR and CIU processing | 0.125 | seconds |
| 5- Net reading rate | 2.985 | reads/second |
| 6-Time to read available Class 2 meters | 2,010 | seconds |
| 7-Reading failure rate per attempt | 30% | percent |
| 8-Threshold of success for one-way to two-way switch | 0.9900 | percent |
| 9-Number (n) of attempts needed to be better than threshold | 7 | attempts |
| 10-Optimizing number of attempts vs. threshold | -0.0098 | |
| 11-Total reading time per attempt (secs.) | 2010 | seconds |
| 11'-Total reading time per attempt (mins.) | 33.5 | minutes |
| 11"-Total time spent in one way exchange (secs.) | 14,070 | seconds |
| 11'''-Total time spent in one way exchange (hrs.) | 3.908 | hours |
| 12-Number of Class 2 remaining to read after attempts | 1.312 | units/cell |
| 21-Total meters per territory | 2,000,000 | units |
| 22-Average number of concentrators | 333.333 | units |
| 23-Average number of meters for two-way exchange | 437.4 | units |
| 24-Time for one two-way communication exchange | 0.405 | seconds/comm |
| 25-Success rate for a two-way exchange | 0.9 | percent |
| 26-Equivalent time for one two-way exchange | 0.450 | seconds/comm |
| 27-Average time to read remaining meters in territory | 196.830 | seconds |
| 27'-Average time to read remaining meters in territory | 0.055 | hours |
| 30-Total time spent in AMR | 3.963 | hours |
| 31-Day | 24 | hours |
| 32-Percentage of time used in AMR (per day) | 16.5% | percent |
| 32'-Percentage of time used in AMR (per month) | 0.55% | percent |

FIG. 7

| Single frequency, Multicell, one-way and two-way AMR and Load Survey | Value | Units |
|---|---|---|
| 1-Month | 30 | days |
| 2-Meters per cell (or MIUs per concentrator) | 6,000 | units/cell |
| 2'-Percentage of Class 2 MIUs in load survey | 1% | percent |
| 2"-Total number of Class 2 meters per cell in load survey | 60 | units |
| 3'-Time for each one-way communication MIU-CIU | 0.210 | seconds/comm |
| 3"-Reading rate | 4.762 | exchanges/second |
| 4-Allow slots for ODR, TDR and CIU processing | 0.125 | seconds |
| 5- Net reading rate | 2.985 | reads/second |
| 6-Time to read available Class 2 meters | 20.1 | seconds |
| 7-Reading failure rate per attempt | 30% | percent |
| 8-Threshold of success for one-way to two-way switch | 0.99 | percent |
| 9-Number (n) of attempts needed to be better than threshold | 7 | attempts |
| 10-Optimizing number of attempts vs. threshold | -0.00978 | |
| 11-Total reading time per attempt (secs.) | 20.1 | seconds |
| 11'-Total reading time per attempt (mins.) | 0.335 | minutes |
| 11"-Total time spent in one way exchange (secs.) | 140.7 | seconds |
| 11'''-Total time spent in one way exchange (mins.) | 2.345 | minutes |
| 12-Number of Class 2 remaining to read after attempts | 0.013122 | units/cell |
| 21-Total meters per territory in load survey | 20,000 | units |
| 22-Average number of concentrators | 333.333 | units |
| 23-Average number of meters for two-way exchange | 4.374 | units |
| 24-Time for one two-way communication exchange | 0.405 | seconds/comm |
| 25-Success rate for a two-way exchange | 0.9 | percent |
| 26-Equivalent time for one two-way exchange | 0.450 | seconds/comm |
| 27-Average time to read remaining meters in territory | 1.968 | seconds |
| 27'-Average time to read remaining meters in territory | 0.0328 | minutes |
| 30-Total time spent in Load Survey per cycle | 2.378 | minutes |
| 31-No. of 15 minute cycles per day | 96 | cycles/day |
| 32'-Time per day used in load survey (minutes) | 228.269 | minutes/day |
| 32'-Time per day used in load survey (hours) | 3.804 | hours/day |
| 33-Percentage of time used in load survey (per day) | 15.85% | percent |
| 33'-Percentage of time used in load survey (per month) | 0.53% | percent |

FIG. 8

| Single frequency, Multicell, one-way and two-way AMR | Value | Units |
|---|---|---|
| 1-Month | 30 | days |
| 2-Meters per cell (or MIUs per concentrator) | 6,000 | units/cell |
| 2'-Percentage of Class 2 MIUs | 25% | percent |
| 2"-Total number of Class 2 meters per cell | 1,500 | units |
| 3'-Time for each one-way communication MIU-CIU | 0.210 | seconds/comm |
| 3"-Reading rate | 4.762 | reads/second |
| 4-Allow slots for ODR, TDR and CIU processing | 0.125 | seconds |
| 5- Net reading rate | 2.985 | reads/second |
| 6-Time to read available Class 2 meters | 502.5 | seconds |
| 7-Reading failure rate per attempt | 30% | percent |
| 8-Threshold of success for one-way to two-way switch | 0.99 | percent |
| 9-Number (n) of attempts needed to be better than threshold | 7 | attempts |
| 10-Optimizing number of attempts vs. threshold | -0.0098 | |
| 11-Total reading time per attempt (secs.) | 502.5 | seconds |
| 11'-Total reading time per attempt (mins.) | 8.375 | minutes |
| 11"-Total time spent in one way exchange (secs.) | 3,517.5 | seconds |
| 11'''-Total time spent in one way exchange (hrs.) | 0.977 | hours |
| 12-Number of Class 2 remaining to read after attempts | 0.328 | units/cell |
| 21-Total meters per territory | 2,000,000 | units |
| 22-Average number of concentrators | 333.333 | units |
| 23-Average number of meters for two-way exchange | 109.4 | units |
| 24-Time for one two-way communication exchange | 0.405 | seconds/comm |
| 25-Success rate for a two-way exchange | 0.9 | percent |
| 26-Equivalent time for one two-way exchange | 0.450 | seconds/comm |
| 27-Average time to read remaining meters in territory | 49.208 | seconds |
| 27'-Average time to read remaining meters in territory | 0.014 | hours |
| 30-Total time spent in AMR | 0.991 | hours |
| 31-Day | 24 | hours |
| 32-Percentage of time used in AMR (per day) | 4.1% | percent |
| 32'-Percentage of time used in AMR (per month) | 0.14% | percent |

FIG. 9

Single frequency, Multicell, 1-way, 2-way, and Class 4 AMR and Load Survey

| | Value | Units |
|---|---|---|
| 1-Month | 30 | days |
| 2-Meters per cell (or MIUs per concentrator) | 6,000 | units/cell |
| 2'-Percentage of Class 4 MIUs | 75% | percent |
| 2"-Total number of Class 4 meters per cell | 4,500 | units |
| 3'-Time for each one-way communication MIU-CIU | 0.210 | seconds/comm |
| 3"-Reading rate | 4.762 | reads/second |
| 4-Reading failure rate per attempt | 30% | percent |
| 5-Coverage required for Class 4 MIUs | 0.999 | percent |
| 6-Retries per period (n) needed to be better than coverage | 10 | attempts |
| 7-Optimizing number of retries vs. coverage | -0.0009941 | |
| 8'-Total time spent in Class 4 exchange (secs.) | 9,450 | seconds |
| 8"-Total time spent in Class 4 exchange (hours) | 2.625 | hours |
| 9-Percentage of time to read Class 4 MIUs (in a day) | 10.9% | percent |
| 10-Average number of unread Class 4 MIUs per concentrator | 0.027 | hours |
| 11-Average number of concentrators | 333.333 | units |
| 12-Average number of unread Class 4 MIUs in territory | 8.857 | units |
| Total time to complete one cycle of AMR and Load Survey | 7.420 | hours |
| Total percentage of time used for AMR and Load Survey (per day) | 30.92% | percent |
| Total percentage of time used for AMR and Load Survey (per month) | 1.03% | percent |

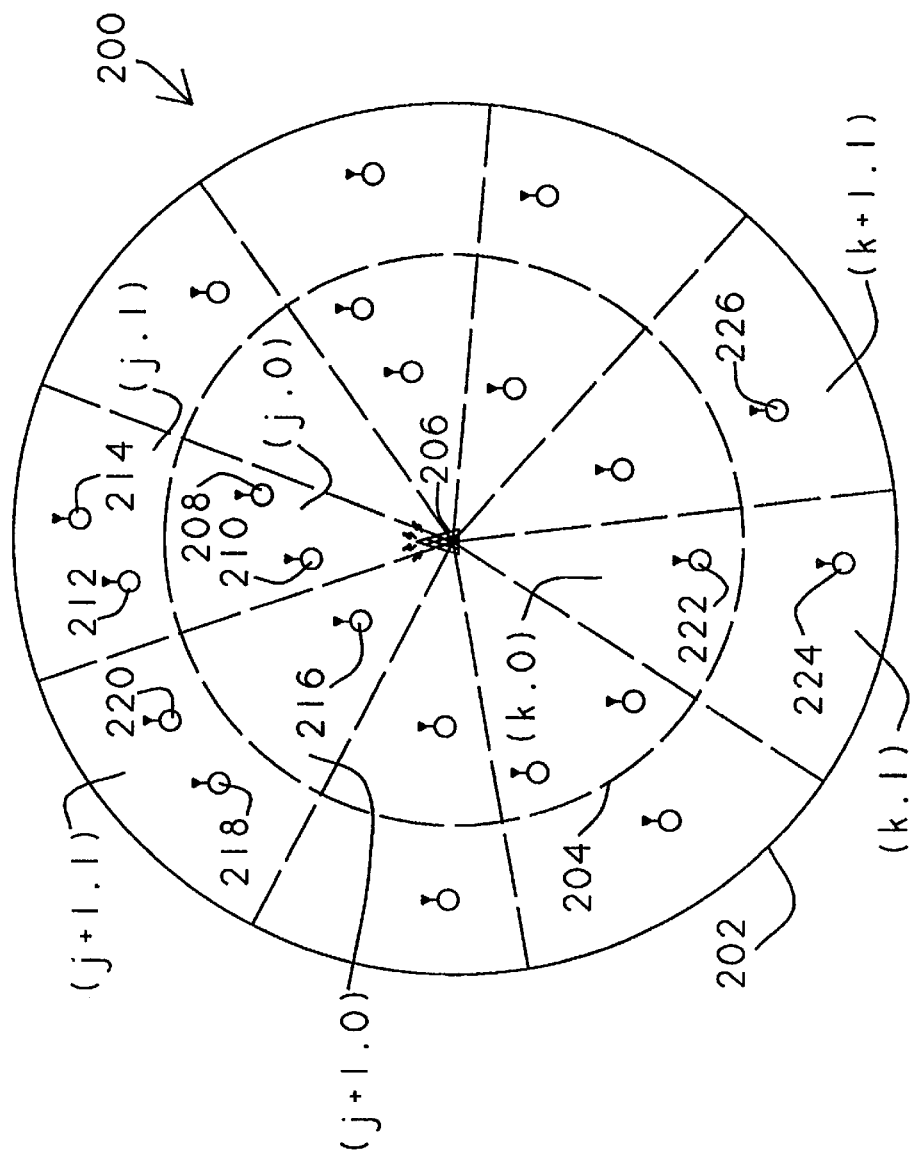

SYSTEM FOR UTILITY METER COMMUNICATIONS USING A SINGLE RF FREQUENCY

CROSS-REFERENCE TO RELATED APPLICATIONS

This application is a continuation-in-part of patent application Ser. No. 08/611,694, filed Mar. 6, 1996.

BACKGROUND OF THE INVENTION

The present invention relates to automatic and remote meter reading systems, of the type used in the utility industry. In particular, the invention relates to radio frequency ("RF") systems used to communicate with metering devices of the type used in the utility (i.e., gas, water, electricity, and heat) industries.

Heretofore, devices of various types have been used for automatic meter reading ("AMR") and for Remote Meter Reading ("RMR") by RF means. Such devices have included handheld reader/programmers vans which contain RF reading equipment, and fixed RF network systems, together with computerized equipment for reading and storing meter readings. The prior art devices operated both in an unlicensed mode and on licensed RF channels.

As used herein, the various types of RF systems will be referred to as being of type Class 1, which means that the RF equipment is full duplex; Class 2, which means that it is half-duplex; Class 3, which means that it is a so-called one and one-half way system; and Class 4, which means that it is a one-way system. By way of example, a battery operated RF system of the type which was heretofore used to read gas utility meters required that the equipment go to "sleep" between reads in order to conserve battery power. When a van passed through the area, it sent out a "wake-up" signal which caused the Encoder/Receiver/Transmitters (i.e., the ERTs) in the area to respond by transmitting encoded signals containing the metering data and any stored tamper signals. Using the above definitions, these ERT units were Class 3 devices. When similar devices were introduced into the electricity industry by companies like Schlumberger Industries, Inc., they were changed from battery operation to AC operation in order to take advantage of the fact that electric power was available. Initially, such devices as the Schlumberger R-200 operated with a "wake-up" signal from the van, and that signal caused the R-200 ERT to send out the encoded signals to the van in a Class 3 mode. Later devices, such as the Schlumberger R-300 Encoder/Transmitter, made use of the available AC power to continuously transmit without the need for a "wake-up" signal, i.e., they operated in a Class 4 mode.

A limitation of the foregoing devices, however, is that either Class 3 or Class 4 operation is limited to AMR applications, i.e., they can be used to encode and transmit metering data, but as they are not two-way systems, they cannot be used for a variety of applications in which utilities have expressed interest.

By way of example, utilities use AMR systems in order to allow for timely reads of customer's meters on a scheduled and/or demand basis, without requiring access to the customer premises. However, in Class 3 and Class 4 operation these applications are of limited use as either a van or a meter reader with a handheld RF meter reader must be sent out to the area where the meters are located, due to the relatively short range of the RF transmissions. Due to the increasing demand for new features, such as outage detection reporting, tamper detection, remote disconnect, and other distribution automation and demand side management ("DA/DSM") applications, two-way systems (i.e., Class 1 or Class 2), in which specific meters can be addressed and can respond, have been desirable.

While such two-way systems could be developed using the same type of van or handheld technology, it makes more sense to develop fixed network two-way systems, so that a request to read a particular meter from a central office would not require that anyone be dispatched to the area by van (or with a handheld) to actually read the meter. Due to the cost of fixed network systems, there has been a continued demand to support functions other than basic meter reading and to support a large number of different metering devices, i.e., electric, water, gas, and heat metering devices, as well as a large number of meters, in order to help spread the cost of the fixed network.

An approach which has been taken in fixed network systems is to use a cellular arrangement of "concentrators" which can communicate with the meters or meter interface units ("MIUs") within their respective cells. As will be understood by those skilled in the art, each cell typically contains a single concentrator along with several hundreds, or thousands, of MIUs. This scheme has a number of limitations if each MIU is a full two-way communicating device and a request/answer scheme is used to read each of them, with each transaction requiring that the concentrator initiate the transaction by requesting that a specific MIU answer the concentrator's request for a meter reading. Serial polling of MIUs, using a request/answer scheme, even to simply obtain meter readings, is extremely time consuming. Further, as each concentrator is provided with a radiating system located in an optimum position to ensure the concentrator's coverage within its cell, i.e., by placing the antenna in a highly elevated location, it is likely that the concentrators of neighboring cells will "hear" each other and cause interference if they are using the same RF frequency at the same time. In the past, this has meant that either more than one RF frequency must be used, which leads to further expense on the part of the utility, or that some type of time division channel access be used. In the former case, the need for multiple RF channels has been cost prohibitive, while in the latter case, the time multiplexing further adds to the time that it takes to simply poll the meters for AMR purposes.

Due to the number of transactions per cell, which is comparable to the number of meters in the case of AMR, but increased by any additional system demands, i.e., load survey, and due to the time it takes for a request/answer transaction, each concentrator will keep its RF frequency ("channel") busy for a period of time during which no other relatively close cells can use the same RF channel. Thus, when using the fixed network schemes of the prior art on a single channel, there were limitations as to the number of cells which could be read on any given day. In certain geographical areas it is difficult to meet the requirements of simply performing the basic AMR operation, together with a limited amount of load survey operations in a reasonable amount of time. Further, all fixed network cellular systems required a rather complex scheme for handling the concentrator access to the channel, and the schemes used were strongly dependent upon cell configuration.

Based upon the foregoing considerations, the number of readings which could be performed by the cellular configurations of the prior art were limited based upon the number of MIUs in the cell, the time taken for each transaction, and the applications, i.e., AMR and load survey, which needed to be performed. They were further limited by the geography of the territory, as geography often determines the distance between concentrators.

In view of the foregoing problems, a new approach to using a fixed network system is required.

SUMMARY OF THE INVENTION

In contrast to the strict request/answer single channel schemes of the prior art, in which the concentrators from adjacent interfering cells could not be used simultaneously, the present invention uses a unique system approach to optimize the primary concentrator time consuming tasks of AMR and load survey.

In the preferred embodiment of the present invention this is accomplished by eliminating the use of the individual request/answer scheme of the prior art in which each MIU was individually polled by the concentrator within its cell to obtain its stored meter reading, with similar polling occurring for both metering and load survey applications.

Instead, in accordance with the present invention, for each AMR schedule and/or load survey schedule, the concentrator in each cell transmits only once, at the beginning of the schedule. That transmission is a general call to all of the MIUs in the cell to respond with their respective meter readings. By having the concentrators in adjacent cells simultaneously broadcast their general request for all MIUs to respond, any adjacent cell concentrator interference is eliminated. In accordance with the present invention, the MIUs within each cell are programmed to transmit their response to the concentrator's MIU request in a serial fashion, i.e., each MIU is assigned a separate time to respond to the concentrator's request. These times are individually indexed, thereby avoiding MIU/MIU interference within each cell. As the definition of a cell means that MIU-to-neighboring-data concentrator unit ("DCU") interference should not exist, the scheme of the present invention provides for simultaneous use of a single channel by adjacent cells.

In an alternative embodiment, it is possible to have potentially conflicting DCUs controlled by the utility's central office to space out the transmissions of their general calls to the MIUs, and, if desired, to program the MIUs in each cell to respond only to the general request of the DCU in its own cell.

BRIEF DESCRIPTION OF THE DRAWING

In the Drawing:

FIG. 3 is a Table which illustrates the problems with performing MIU reads using the conventional request/answer scheme of the prior art;

FIG. 6 is a table which illustrates the manner in which the present inventive method is able to save a substantial amount of time in performing MIU reads;

FIG. 7 is a table which illustrates the way the present inventive method is able to save a substantial amount of time when load surveys are being performed;

FIGS. 8 and 9 are tables which illustrate the way the present invention can be used with a mix of Class 2 and Class 4 MIUs; FIG. 11 illustrates a single cell to illustrate the preferred manner in which a number of MIUs are assigned their AMR reporting sequences based upon their respective physical distances from one another.

DETAILED DESCRIPTION OF THE PREFERRED OF THE INVENTION

As described above, the present invention relates to an automatic meter reading ("AMR") system of the type used for reading utility (water, gas, electric, and/or heat) meters by using a fixed RF network.

Figure 1:
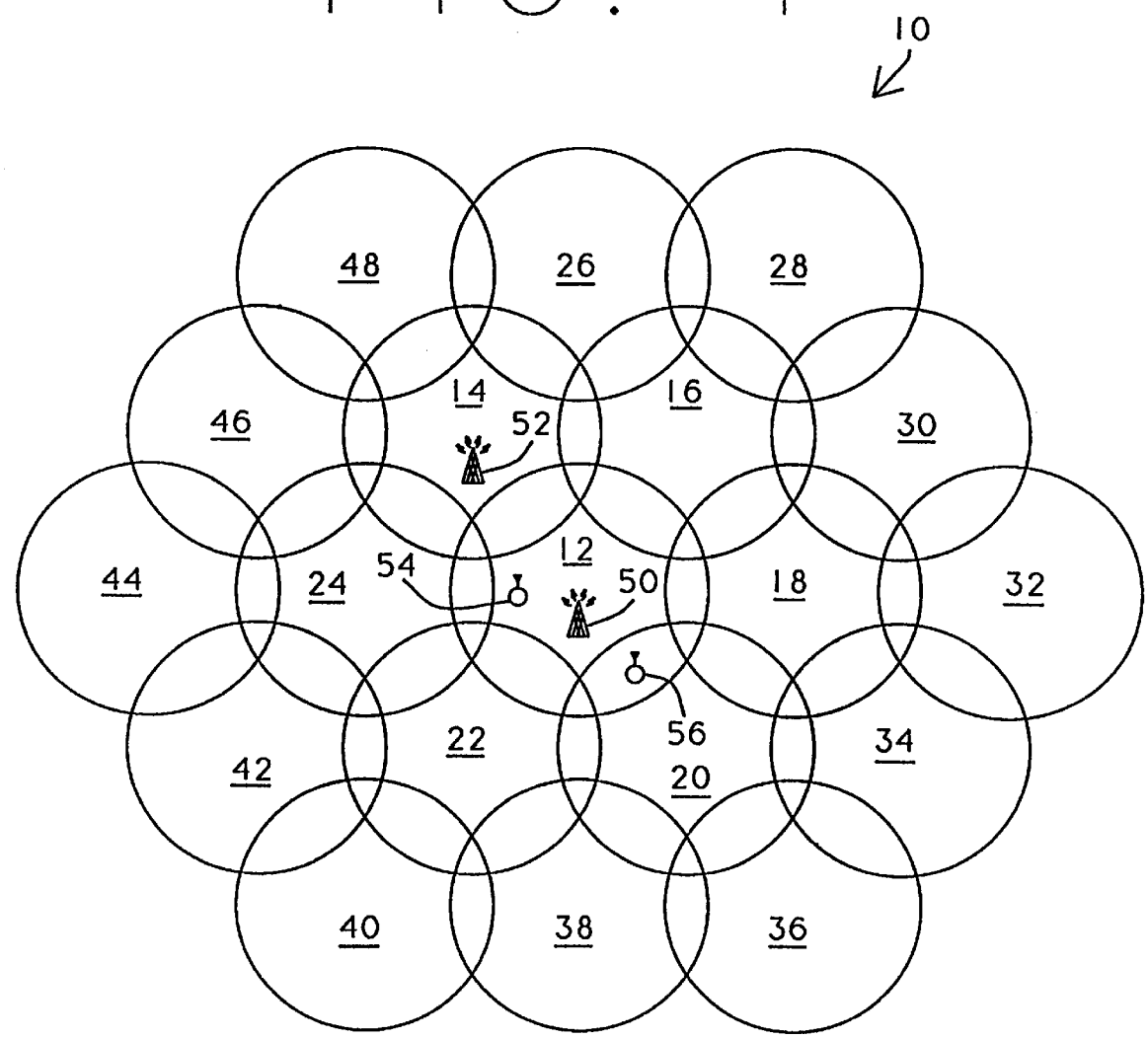
FIG. 1 illustrates a typical fixed network cellular system of the type referred to herein.

Referring to FIG. 1, a portion of a fixed RF cellular network 10 is shown. The portion of the network 10 which is illustrated is comprised of nineteen cells, 12, 14, 16, 18, 20, 22, 24, 26, 28, 30, 32, 34, 36, 38, 40, 42, 44, 46, 48. However, those skilled in the art will recognize that an actual network could be comprised of either a fewer or greater number of cells.

Each of the cells in the network 10 typically contains a single Data Concentrator Unit ("DCU"), such as the DCUs which are shown schematically by the antenna symbols 50, 52 shown in the innermost cell 12, and in adjacent cell 14, respectively. Further, each cell will typically have a large number, i.e., from hundreds to thousands of Meter Interface Units ("MIUs"), such as the MIUs 54, 56 which are in cell 12.

As will be recognized by those skilled in the art, given the adjacent locations of various cells, i.e., cells 12, 14, each containing relatively high powered DCUs 50, 52, respectively, if the DCUs are using the same RF frequency at the same times, there is a good possibility that there will be DCU/DCU interference. This is particularly true given that some overlap of adjacent cells is necessary in order to insure proper geographic coverage of all areas within each of the cells. In fact DCUs in cells as far away as two cell diameters (referred to herein as "relatively adjacent" cells), i.e., cells 12 and 48 (as shown in FIG. 1), can interfere due the high power of the DCUs and their geographical locations.

The prior networks avoided this type of problem either by using different RF frequencies for adjacent (and relatively adjacent) cells, or, alternatively, using time displacement of transmissions in adjacent (and relatively adjacent) cells. Unfortunately, when one is operating a two-way (Class 1 or Class 2) system in which both the DCUs and the MIUs are able to initiate RF communications, the number of RF frequencies (channels) which must be employed in order to prevent DCU/DCU interference is quite large, i.e., due to the potential for DCU/DCU interference between the DCUs in relatively adjacent cells, about nineteen different RF frequencies would be required in a typical network cell configuration, as shown in FIG. 1. As can be readily understood, it is very costly to obtain licensing for nineteen channels and to maintain equipment which could be operated on nineteen different channels. On the other hand, the use of one RF channel together with time displacement would require that as much as nineteen times the time for a single cell would be needed.

Figure 2:
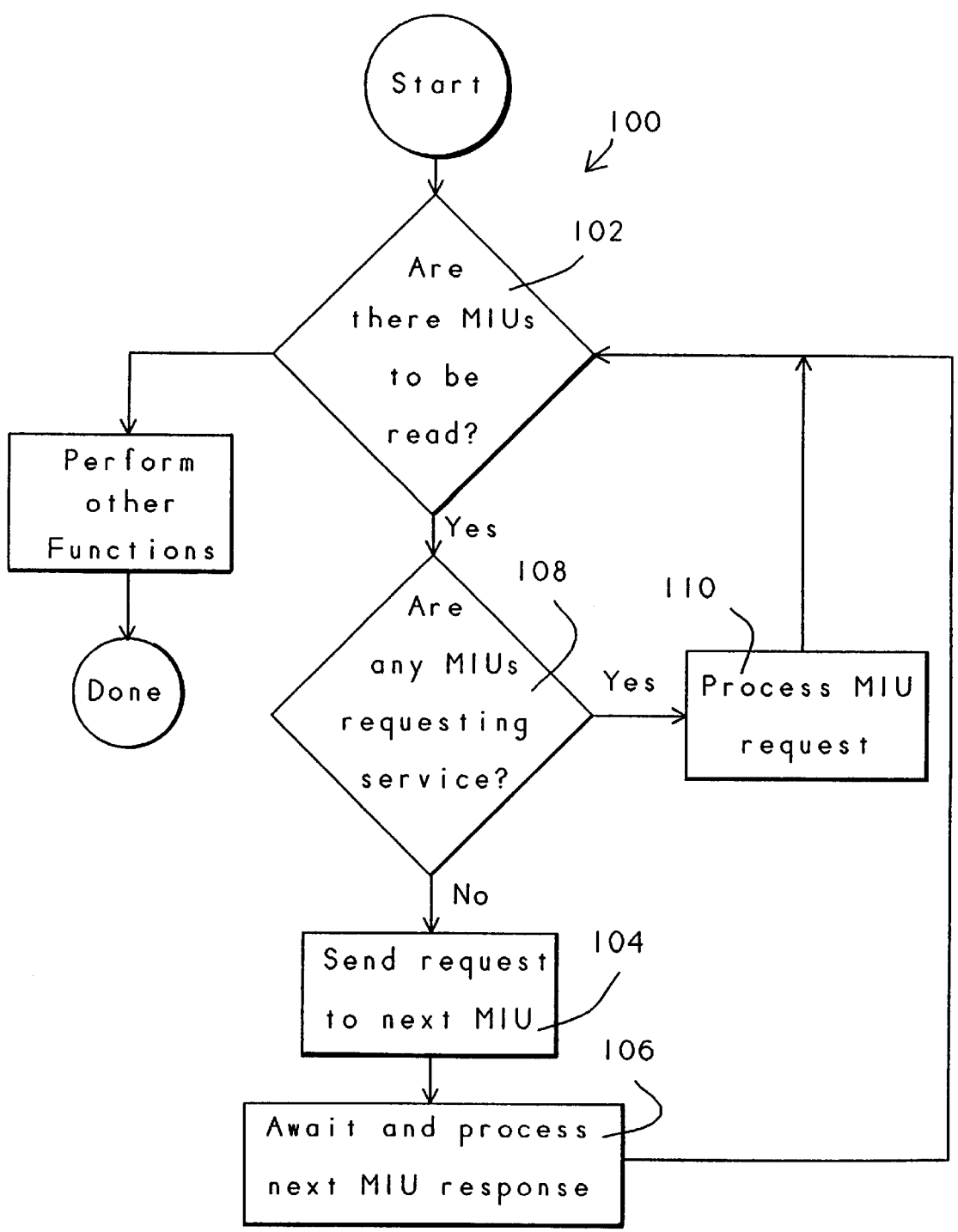
FIG. 2 is a flow chart which shows the prior art method of interrogating MIUs by a DCU.

Referring to FIG. 2, a flow chart illustrating the procedure used to perform various functions is shown. In a "typical" highly populated system, as depicted in FIG. 1 and explained more fully with reference to FIGS. 3 and 4, there might be about 2,000,000 MIUs. These may be comprised of MIUs for reading gas, water, electricity, and/or heat meters, and they are all assumed to be operating in a Class 2 mode. By way of example, there may be about 6,000 meters (gas, water, electricity, and/or heat) per concentrator (i.e., 6,000 MIUs per cell).

Referring to the flow chart shown in FIG. 2, heretofore the usual method of reading Class 2 (or Class 1) two-way MIUs was for the DCU to determine if there were any MIUs waiting to be read as shown at 102. If any MIUs needed reading, and if no other MIUs were requesting service, i.e., load survey, tamper reporting, etc., then the DCU would send a request to the next MIU scheduled to be read (block 104), and it would await the response from that MIU, and it would process the response (block 106). If there was an MIU which was requesting service (block 108), then that MIU's request would be processed (block 110) prior to continuing with the reading of unread MIUs.

Figure 4:
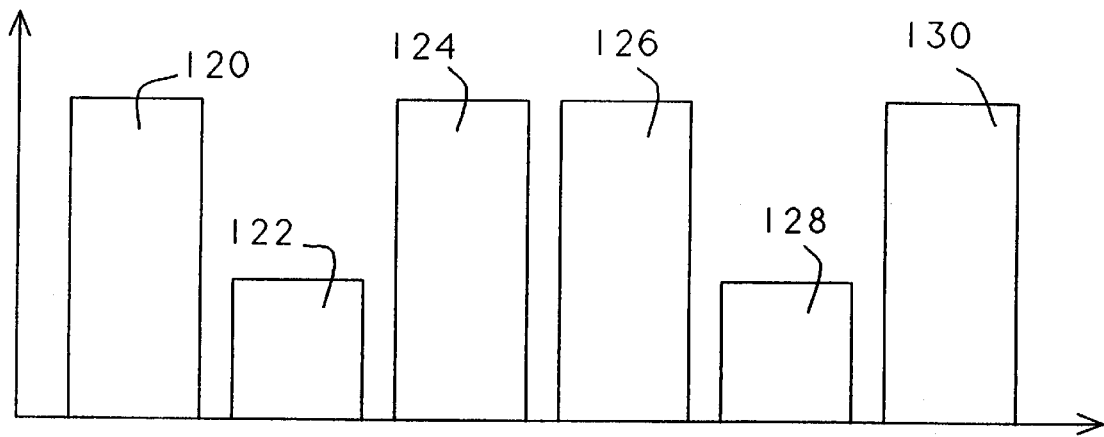
FIG. 4 is a timing diagram further illustrating the problem of performing MIU reads using the conventional request/answer scheme of the prior art.

With reference to the timing diagram of FIG. 4, in the meter reading cycle of the prior art, the DCU transmitted a request (at 120) to $MIU_1$ to send its reading to the DCU. Next $MIU_1$ sent its reading to the DCU (at 122), and then the DCU sent an acknowledgment signal to $MIU_1$ (at 124), thereby completing the request/answer sequence for $MIU_1$. Thereafter, the DCU performed the same sequence with $MIU_2$ (at 126, 128, 130), $MIU_3$, etc.

Referring to the Table in FIG. 3, if it takes a certain amount of time, $\tau_{ra}$, for a DCU to make a request of each MIU in its cell for a reading, for the selected MIU to answer the requesting DCU, and for the DCU to acknowledge the response of the MIU, then the number of readings per month will be limited. By way of example, for a $\tau_{ra}$ of 405 milliseconds (ms), 2.469 MIUs can be read per second. As there is a statistical probability that any given read might not be successful, FIG. 3 assumes a 90% success rate for each reading attempt, which brings the effective MIU read rate down to 2.222 reads per second. Given that there are 2,000,000 MIUs in the territory, and assuming that there is an 85% reliability rate on readings, then there are 5,760,000 reading periods available for all purposes. However, if each MIU must be read once per month, simply to perform monthly billings, then 2,000,000 of the available readings are already used for billing (AMR) purposes alone, leaving only 3,760,000 time slots available for all other purposes. Thus, if load survey was desired, with each MIU involved in load survey to be accessed once every 15 minutes during the month, only about 1,300 MIUs could be involved in load survey out of the 2,000,000 MIUs in the territory. As will be recognized by those skilled in the art, this means that only about 0.065% of the MIUs in the territory could be involved in load surveys—a very small number given the cost of a fixed network system.

Another way of looking at it is that 34.7% of the available meter readings in a given month (30 days) are used solely to read each meter for billing purposes alone. That means that more than 10 days per month will be occupied to simply perform meter reading for billing purposes.

From the foregoing analysis, it was determined that while Class 1 and Class 2 systems provide the capability of supporting a "request-answer" form of communications, the time required to perform such communications is simply too great for a large scale deployment of MIUs to operate in a satisfactory manner. Yet, absent the capability for a large scale deployment, the cost of a fixed network system could be hard to justify.

Figure 5:
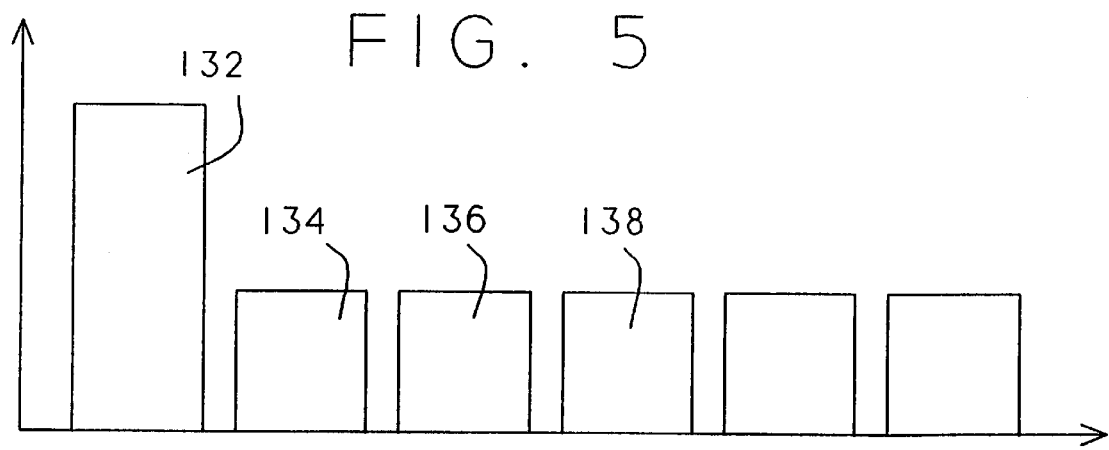
FIG. 5 is a timing diagram which illustrates the way the present inventive method operates in performing reads and/or load survey operations.

With reference to FIG. 5, in accordance with the present invention, rather than using an individual "request-answer" system to perform MIU readings, each MIU in each cell is assigned a unique time displacement number, $n_i$. Each of the MIUs in each cell is programmed to receive a single, general meter reading request from the cell's DCU. Then, based upon the time it takes for a single MIU to send its normal reply, and allowing for some additional "guard time", for a total time of $\tau_{res}$ per MIU, each MIU will respond in turn to a DCU meter reading request by waiting for $n_i*\tau$ seconds, and then sending in its meter reading. As will be obvious to those skilled in the art, the use of this technique means that if each meter reading request of the prior art took (approximately) $\tau_{ra}$ seconds (bearing in mind, that each prior art meter reading request had to uniquely identify the specific MIU being queried, and to acknowledge the MIU, whereas the general meter reading request of the present invention is simply a request for all meters in the cell to reply (in a predetermined order) with their respective meter identifications and readings), then the amount of time required to read all N of the MIUs in any cell would go from (approximately) $N*\tau_{ra}$ to approximately $(N+1)*\tau_{res}$ (allowing for $\tau_{res}$ as the time for the DCU to make their general request). As $\tau_{res}$ is typically less than one-half $\tau_{ra}$, a substantial amount of time can be saved using the present invention. More importantly, however, is the fact that the DCUs in each of the cells, including adjacent cells, could be programmed to each make its general request for readings at either the same time, or, alternatively, they may be sequenced so that each DCU makes its request serially before any of the MIUs begins to answer the requests. This would entail a very short wait by the first MIU in the first cell to receive the general call for a reading (i.e., on the order of $19*\tau_{res}$) with a shorter wait on the part of the first MIU in each succeeding cell. Consequently, there will be no DCU/DCU interference as all of the DCUs would be broadcasting the same message at the same time, or, alternatively, when no other DCU or MIU is transmitting. Further, there would be no other interference, as the MIUs broadcast with lower power than the DCUs. Thus, a very important feature of the present invention is that even though only a single channel is used, adjacent cell interference is substantially eliminated, due to the extremely limited number of times that a DCU must transmit, thereby allowing not only for greater throughput on a per cell basis, but also on a per system (territory) basis.

Referring now to FIG. 6, if $\tau_{res}$ is approximately 210 ms (i.e., the one-way time for each MIU in a cell to respond to a general DCU reading request), and allowing an additional 125 ms slot per MIU reading for outage detection readings ("ODR"), tamper-detection readings ("TDR"), and DCU processing of responses, there would be a net reading rate of about 2.985 reads per second. Consequently, it would take approximately 2,010 seconds (33.5 minutes) to read each of the 6,000 meters in a cell. Thus, even if a conservative reading failure rate of 30% was assumed, and an overall success rate greater than 99% was desired, it would be necessary to read each MIU seven times, i.e., 14,070 seconds (3.908 hours), to be assured of having properly read more than 99% of the MIUs in each cell.

Given the above assumptions, there would (on average) still be 1.312 unread MIUs per cell, or about 437.4 MIUs out of the total population of 2,000,000 MIUs which have not been read successfully. It is assumed that these MIUs could be read by the conventional "request-answer" mode described in FIGS. 2, 3, and 4, with a "request-answer" time period of about 405 ms (allowing for a 90% success rate). This additional two-way reading of the hard to read MIUs would add (for the entire 2,000,000 MIU population) only an additional 196.83 seconds (0.055 hours) per cycle. Thus, the entire MIU population could be read using the system of the present invention with a success rate greater than 99%, and the unread meters could be read using a normal two-way "request-answer" exchange in a little over 3 minutes for all of the cells. Note, that this extra time assumes that only one DCU is active at a time, notwithstanding that only 1 out of about 19 cells could possibly interfere with reasonably adjacent cells.

As will be obvious to those skilled in the art, as the present invention eliminates any potential for DCU/DCU interference, the number of cells in the system is no longer a relevant factor in determining the time to read all of the MIUs in a system. Consequently, a substantial amount of time will be available for other functions, such as load survey and on-demand reading. With reference to the Table in FIG. 7, it can be observed that by having a general "load survey" request which goes out to those MIUs which have been programmed to respond to such a request by sequentially sending out their load survey data, it is possible to have 1% of the MIUs in a cell respond to load survey requests every 15 minutes by using only about 15.85% of the time available per day.

Referring to FIGS. 6 and 7, it can be seen that by using the present inventive method, both AMR reading (3.963 hours/day) and load survey applications (3.804 hours/day) can be accomplished in 7.867 hours per day in a cell containing 6,000 MIUs. Thus, less than one-third of the time available needs to be spent performing both AMR and load survey applications, thereby leaving a substantial amount of time for other desired functions.

Referring now to FIGS. 8 and 9, the use of the present invention with a mix of Class 2 MIUs (25%) and Class 4 MIUs (75%) is shown. As indicated, the total time required to perform both AMR and load survey for 6,000 MIUs (1,500 Class 2 and 4,500 Class 4) would be only about 7.42 hours per day, leaving more than 61% of the day available for other functions.

Figure 10:
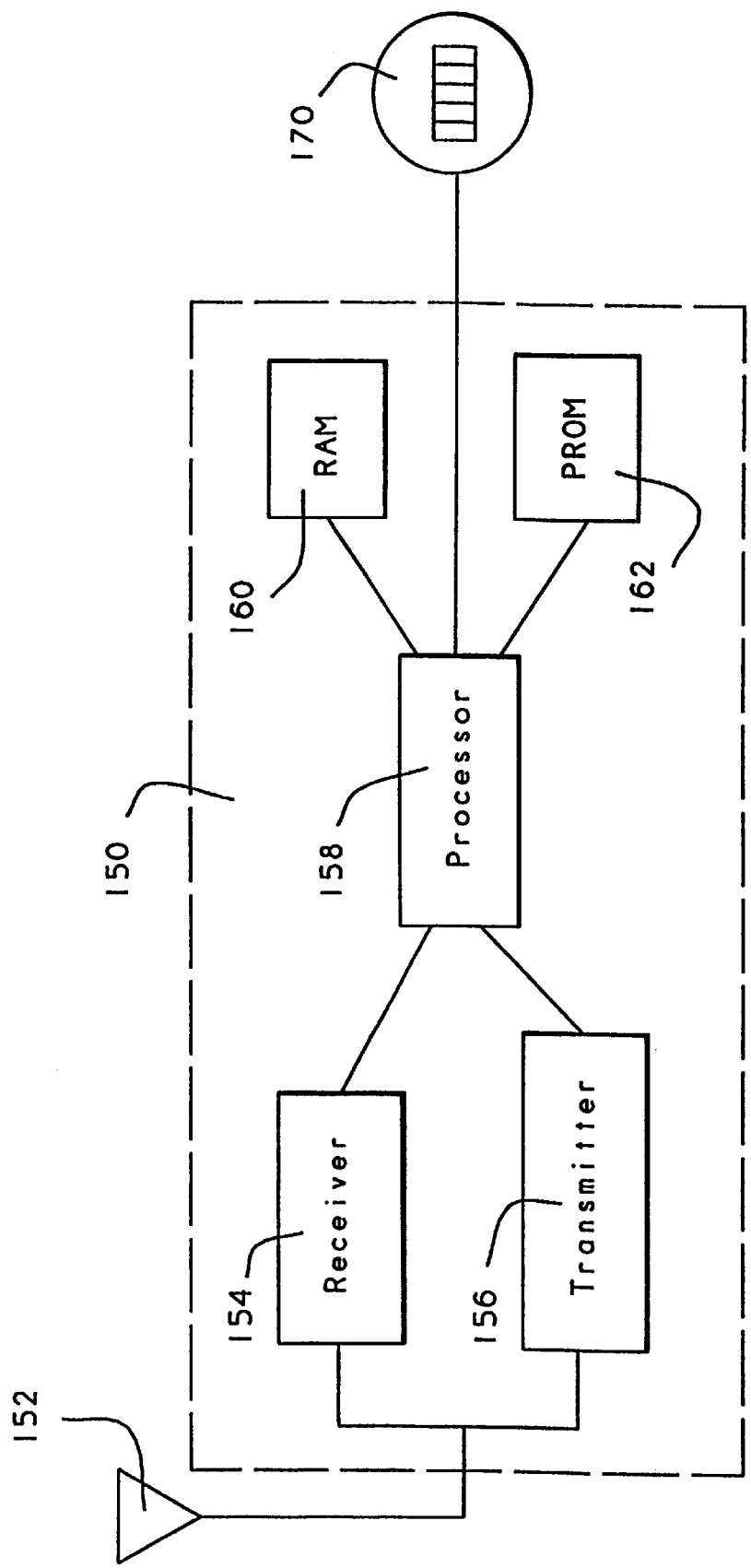
FIG. 10 is a block diagram of an MIU in accordance with the present invention.

Turning now to FIG. 10, a simple block diagram of an MIU 150 in accordance with the present invention, is shown. The MIU 150 is attached to a meter 170, which may be any type of utility meter (water, gas, electricity, or heat) which includes an appropriate pulser, encoder, tamper detection sensor, outage detection sensor, or other electronics, including registers, mass memory, etc.

The MIU includes a processor 158 which is typically a microprocessor, which is connected to RAM 160 and a read only memory, which may be comprised of the programmable read only memory 162. The RAM 160 may contain some non-volatile memory for storing parameters in the event of a power outage (i.e., meter readings, tamper detections, etc.). The processor controls, and communicates with, a receiver 154 and a transmitter 156. Both the receiver 154 and the transmitter 156 are connected to a suitable antenna 152, which may be either external or internal, or which may be formed as part of the circuit board on which the MIU's circuitry is mounted.

As explained above, the MIU 150 is either a Class 1 or Class 2 (two-way) MIU. Typically, the MIU 150 includes an identification number which is stored in a non-volatile memory, such as the PROM 162, which uniquely identifies the MIU 150 in the system. A DCU can communicate with the MIU 150 and based upon the software which is in the MIU's PROM 162, the MIU 150 can perform various functions, such as meter reading, load survey reporting, etc. Consistent with the present invention, a number, representative of the offset time which the MIU 150 should wait after receiving a general request for a meter reading from the MIU's cell's DCU prior to transmitting the reading of the meter 170, can be stored in the PROM 162, and changed as needed by the DCU. Similarly, other data, i.e., whether the MIU 150 is to be included in a load survey application, and, if so, how long it should wait after receiving a general command to transmit load survey data, can also be stored in the PROM 162.

As will be obvious those skilled in the art, numerous changes can be made to the MIU 150 without departing from the spirit or intended scope of the present invention, and the simplistic block diagram illustrated in FIG. 10 was meant only to show one possible method of building an MIU 150 having the minimum functionality required by the present invention.

By way of example, the MIU 150 is shown to include a receiver 154. While a Class 3 MIU also includes a receiver, the receiver in a Class 3 MIU is not adapted to be able to download a number representative of the time delay for a Class 3 MIU to have to wait until transmitting a response to a DCU. Similarly, a Class 4 MIU contains no receiver. Consequently, for a Class 3 unit to be able to operate in accordance with the time delayed transmission of the present invention, it would have to be programmed either with a reader/programmer or by replacing its PROM 162. Alternatively, these units, operating in Class 3 and Class 4, are able to transmit randomly, as explained in conjunction with the discussion herein relating to FIG. 9.

AMR reporting is often conducted as a "background" task, in order to allow other "unscheduled" tasks, such as demand reporting and alarm reporting, to take place as soon as an event requires such action. Also, the MIUs are always in a "listen" mode, so that if a message is directed to them, they will receive it. Consequently, any time that a message is transmitted on the channel, whether by an MIU or by the Concentrator, all of the MIUs which receive the message will process it, in order to determine whether it was directed to them. Also, if an MIU "hears" another transmitting, it will wait to transmit any message which it has until the channel is clear. What this means is that if there are a number of MIUs which are physically close to one another, and which are also close to one another in their AMR reporting schedules, it is quite possible for a particular MIU, which is number, k, in the reporting schedule to be reporting its meter reading, while the next MIU, (k+1), in the AMR reporting schedule is preparing to report its own reading. As a result, the MIU which is at position (k+1) in the AMR reporting schedule, i.e., $MIU_k$'s will "hear" $MIU_k$ reporting. Therefore, $MIU_{k+}$will delay its own report until $MIU_k$ has finished reporting and the channel is clear. This delay in time of $MIU_k$'s report will propagate down the AMR reporting schedule, as long as physically close MIUs are also close together in the AMR reporting schedule (i.e., if physically close MIUs are temporally close in AMR reporting times).

In order to avoid the problem of reporting delays caused by physically close MIUs being temporally close in AMR reporting times, the present invention includes means for assigning AMR reporting times as part of the AMR scheduling function of the system. In particular, to the extent possible, MIUs which are physically close to one another should be separated in their respective AMR reporting times. In the preferred embodiment of the invention, this is accomplished by providing a data base of MIUs in each cell. A part of the data base associated with each of the MIUs is its location. In creating an AMR reporting schedule, the sequence number (in the AMR reporting schedule) is assigned (to the extent possible), based upon the physical locations of the MIUs, to avoid physically close MIUs from being temporally close in the AMR reporting schedule.

In a preferred embodiment of the invention, the foregoing assignment is accomplished by breaking the cell into a number, j, of pie shaped segments. Each of the j pie shaped segments is further divided into two portions, i.e., a "near" segment portion and a "far" segment portion, as illustrated in FIG. 1. As shown a cell 200 has an outer ring 202 which constitutes the outer boundary of the cell 200, and an inner ring, or portion separator boundary 204, which separates the near portions of the segments (i.e., those closest to concentrator 206), herein called (j,0), from the far portions of the segments (i.e., those furthest from concentrator 206), herein called (j,1). The various MIUs are given locations within the MIU data base which indicate that they are in a particular location based upon their (segment, portion) assignment. Thus, an MIU in (j,0) would be in the near portion of segment j, and an MIU in (j,1) would be in the far portion of segment j.

Based upon the above definitions, with reference to FIG. 11, MIUs 208, 210 are in segment (j,0), and MIUs 212,214 are in segment (j,1). Similarly, MIU 216 is in segment (j+1,0), and MIUs 218,220 are in segment (j+1,1). MIU 222 may be considered to be in segment (k,0), and MIU 224 may be considered to be in segment (k,1),.where segment k is substantially opposite segment j.

In one approach, which has been successfully tested, the assignment of MIUs for AMR reporting purposes can be done as follows. In order to create a new AMR reporting schedule, the sequential assignment of all of the MIUs in the cell can be cleared (or set to zero), and a first MIU, i.e., MIU 210 is selected to be assigned position one in the (temporal) AMR reporting location. The selection of the first MIU, may be accomplished in any desired manner. For example, the first MIU listed in the database may be selected. Alternatively, the first MIU may be randomly selected from the database. The physical location of MIU 210 is noted from the data base to be in segment (j,0). A search is conducted for an MIU, i.e., MIU 224, which is physically located in segment (k,1), the far portion of the segment on the opposite side of CIU 206 from MIU 210. Thus, MIU 210 and MIU 224 which are adjacent to one another in the temporal MIU AMR reporting schedule, are separated from one another physically. This physical separation of adjacent (reporting) MIUs guarantees that the AMR reporting by MIU 224 will not be delayed by the prior AMR reporting of MIU 210, as the MIUs have sufficiently low power that if they are physically far from one another, the one which is reporting its meter reading will not be heard by the next one in the AMR reporting schedule, so its reporting will not be delayed.

After MIU 224 is assigned position number 2 in the AMR reporting schedule, another MIU must be selected to be assigned position number 3 in the AMR reporting schedule. In accordance with the preferred embodiment of the invention, an MIU in the "near" portion of segment j+1, i.e., an MIU such as MIU 216 in segment (j+1,0) is selected to report in AMR position 3. Then, an MIU, such as MIU 226 in segment (k+1,1) is assigned to report in AMR position 4, and so on. As each MIU is assigned an AMR reporting position, the prior "0" in its AMR reporting position is changed to the newly assigned reporting position, and it is no longer available for assignment of an AMR reporting position. Accordingly, if there is no MIU available in the next segment from which an assignment is to be made, the next assignment will be made from the "far" portion of the segment (if the assignment was to have been made from the "near" portion), or, alternatively, from the next successive segment (if the assignment was to be made from the "far" portion of a segment, thereby preventing, to the extent possible two successive reports being made from two MIUs which are both in the "near" portions of different segments).

As there must be at least as many MIUs in the "far" portions of the segments as in the "near" portions, the definition of "near" and "far" can be dynamically adjusted, by moving the portion separator boundary 204 as MIUs are added to the data base. Similarly, due to population groupings, the term "segment" is not meant to imply that all segments have the same angular size. Thus, some pie shaped slices may be bigger than others, in order that each of the segments contains a like number of MIUs.

While the preferred embodiment of the invention makes use of pie shaped segments (wedges and semi-wedges) for the MIU locations, other methods may be used without departing from the spirit or intended scope of the present invention. For example, the MIU data base can include the latitude and longitude of the various MIUs, i.e., their (lat, long) positions. These may be assigned by the meter installers who may carry navigation devices, which make use of the global position satellite ("GPS") system. Alternatively, (lat,long) positions may be obtained from computerized street maps. It is then possible to use the (lat,long) information to determine the actual distances between the various MIUs, and the AMR reporting sequence can be assigned based upon the MIUs distances from one another. In assigning the AMR sequence based upon the actual distances between Mius, first a minimum acceptable distance would be determined, where that would correspond to the distance at which one MIU could not interfere with another. Then, MIUs could be selected sequentially until one is found which exceeds the minimum acceptable distance from the current one, and so on. In the event that no MIU meets the minimum acceptable distance criteria, then it is possible to skip an AMR reporting sequence number in order to insure that no two MIUs having adjacent AMR reporting positions will be within the minimum acceptable distance from one another.

As will be apparent to those skilled in the art, numerous other changes can be made without departing from the spirit or intended scope of the present invention.

We claim:

1. An improved cellular based, fixed network AMR system of the type which comprises:

(i) at least one cell containing a concentrator unit which is able to use RF communications to transmit to meter interface units ("MIUs") within the cell and to receive RF communications from MIUs within the cell; and (ii) means within each of said MIUs for transmitting data to said concentrator in a serial fashion such that upon receipt by said MIU of a command from the concentrator unit within said cell to transmit data, each of said MIUs will transmit its data to said concentrator serially, such that only one of said MIUs in each cell is transmitting its data at any time, the improvement comprising means for assigning to each MIU a number which constitutes said MIU's reporting sequence, said means for assigning being adapted to select MIUs to have adjacent temporal reporting sequences which are sufficiently distant from one another that the first of said MIUs to report will be far enough away from the following MIU to report that said following MIU to report will be unable to receive the RF transmission from said first MIU.

2. The improved cellular based, fixed network AMR system of claim 1 wherein each of said means for assigning includes a data base having the location of each MIU in said cell.

3. The cellular based, fixed network AMR system of claim 2 wherein said cell is divided into segments, each segment is divided into a near portion and a far portion, and said data base includes the segment and portion of each MIU in said cell.

4. The improved cellular based, fixed network AMR system of claim 3 wherein said means further comprises means for selecting Mius and assigning to them a sequence number for AMR reporting, such that MIUs which are assigned sequential sequence numbers are physically remote from one another.

5. The improved cellular based, fixed network AMR system of claim 4 wherein MIUs are selected for sequential AMR reporting from segments which are on substantially opposite sides of sa id concentrator unit.

6. The improved cellular based, fixed network AMR system of claim 5 wherein MIUs are alternately selected for sequential AMR reporting from near portions and far portions of said segments.

7. The improved cellular based, fixed network AMR system of claim 2 wherein said data base includes the latitude and longitude of each MIU in said cell.

8. The improved cellular based, fixed network AMR system of claim 7 wherein MIUs are sequentially selected for AMR reporting provided that they are at least a minimum acceptable distance from the preceding MIU's AMR reporting sequence number.

9. The improved cellular based, fixed network AMR system of claim 8 wherein AMR sequence numbers are skipped in the event that no MIU can be identified which is at least the minimum acceptable distance from the last MIU in the AMR reporting sequence.

* * * * *